2 Sheets—Sheet 1.

C. A. HOTCHKISS.
CURRY-COMB.

No. 177,838. Patented May 23, 1876.

WITNESSES
Robert Everett
George E. Upham

INVENTOR
Charles A. Hotchkiss
Gilmore, Smith & Co.
ATTORNEYS

N. PETERS, PHOTO-LITHOGRAPHER, WASHINGTON, D. C.

C. A. HOTCHKISS.
CURRY-COMB.
No. 177,838. Patented May 23, 1876.
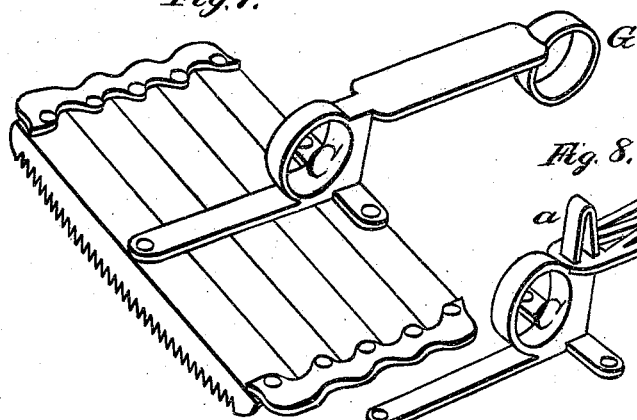
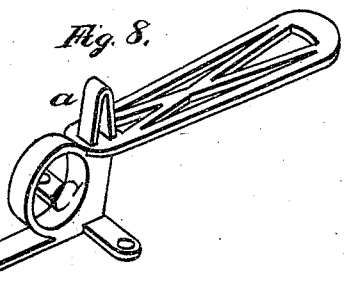
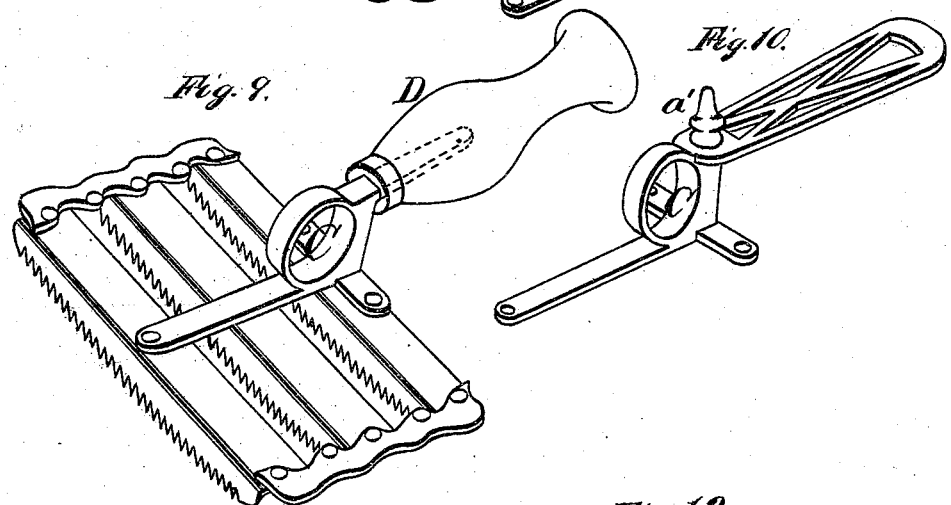
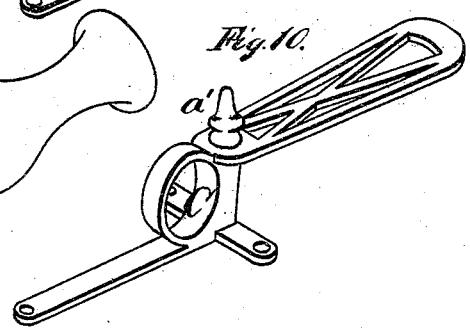
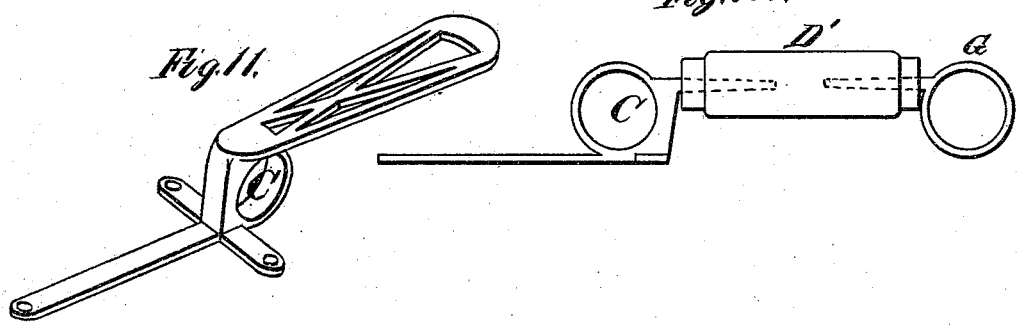
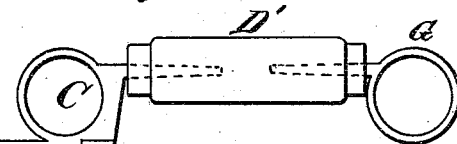
WITNESSES
Robert Everett
George E. Upham.
INVENTOR,
Charles A. Hotchkiss
Gilmore, Smith &co.
ATTORNEYS

UNITED STATES PATENT OFFICE.

CHARLES A. HOTCHKISS, OF BRIDGEPORT, CONNECTICUT.

IMPROVEMENT IN CURRY-COMBS.

Specification forming part of Letters Patent No. 177,838, dated May 23, 1876; application filed March 15, 1876.

*To all whom it may concern:*

Be it known that I, CHARLES A. HOTCHKISS, of Bridgeport, in the county of Fairfield and State of Connecticut, have invented a new and valuable Improvement in Curry-Combs; and I do hereby declare that the following is a full, clear, and exact description of the construction and operation of the same, reference being had to the annexed drawings, making a part of this specification, and to the letters and figures of reference marked thereon.

Figure 1:
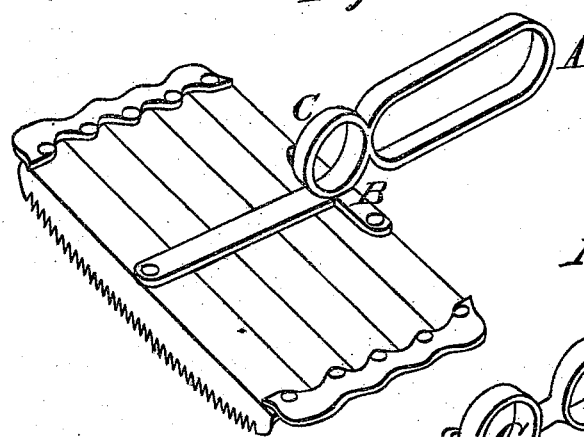
Figure 2:
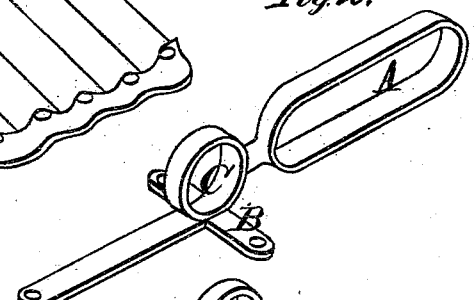
Figure 3:
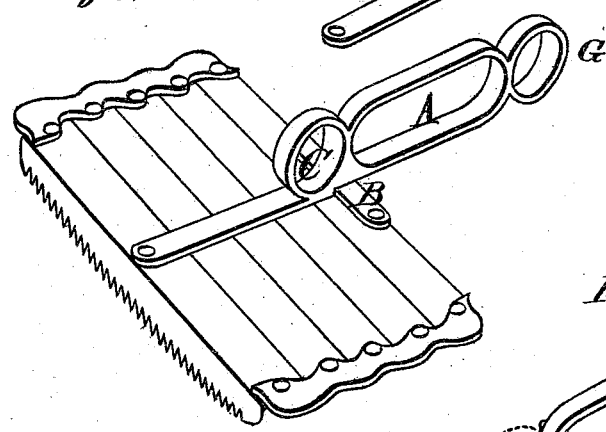
Figure 4:
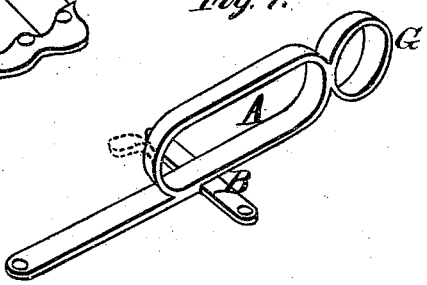
Figure 5:
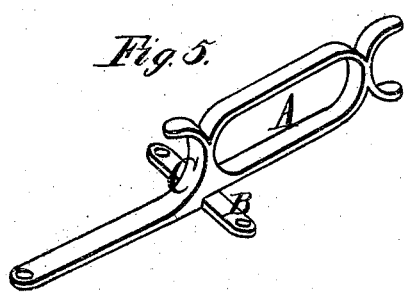
Figure 6:
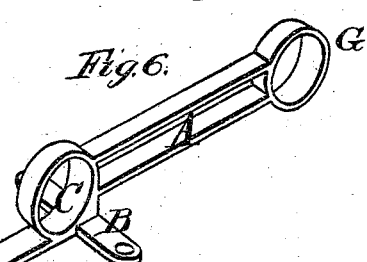

Figure 1 of the drawings is a representation of a perspective view of my curry-comb, and Fig. 2 is a detail perspective of the same. Fig. 3 is a perspective view of a modification of my curry-comb; and Figs. 4, 5, and 6 are various modifications of the handle thereof. Fig. 7 is a perspective view of another modification, and Fig. 8 modification of the handle thereof. Fig. 9 is a perspective view of another modification of my curry-comb, and Figs. 10 and 11 are perspective views of modification of the handle. Fig. 12 is a side view of a modification of the handle.

This invention relates to curry-combs; and it consists in providing for such combs a side handle or tang, with which there is formed, in a single piece, both a spider or frame for connection with the comb-back, and a thumb ring or support at or near the end of the handle, next to the comb, as hereinafter described.

A of the drawings represents a metallic handle, and B the spider or frame, adapted for attachment to the comb-back by screws or rivets, as shown. C represents a thumb rest or support, connected with the handle at or near its end next the comb.

I sometimes form this support in the shape of a segment of a circle or horn, as shown in Figs. 4 and 5; but I find a ring preferable, as shown in the other figures of the drawings. Sometimes I find it desirable to construct this thumb-rest under the handle immediately in the rear of the connecting upright bar, as shown in Fig. 11; but I find a better purchase is secured, and, upon the whole, it is preferable to form the ring or support at the front end of the handle, as represented in the remaining figures.

In place of a solid metallic handle I sometimes form a tang only, as shown in Figs. 9 and 12.

The letters D D represent wooden handles, respectively, attached to tangs, shown on said Figs. 9 and 12. The letters $a$ $a'$, on Figs. 8 and 10, represent different forms of hand-stays, which I sometimes construct on the top of the handle near its front end, the object being to provide a lateral support or bearing for the hand while the thumb occupies its rest.

My metallic handles are constructed in any desirable shape, a great variety of which is illustrated in the drawings.

The particular form thereof is immaterial, except that care should be taken to make them easy to grasp and hold, and of such size and weight as will combine the lightness and strength desired.

To afford ready means for suspension, as well as a lateral outward bearing for the operating-hand or an additional thumb-support, when the comb is used with the little finger next the comb, I sometimes construct the handle with an end ring, marked G, on Figs. 3, 4, 6, 7, and 12. A modification of this ring is shown on Fig. 5, which shows a segment only.

My metallic handle, thumb-rests, connecting-spider, and hand-stays are usually cast of malleable iron, and are formed of one piece of casting only; but I do not wish to confine my method of construction to casting these several parts in one piece. They can be manufactured easily and cheaply of several pieces when desirable.

In case a wooden handle is used, a tang is substituted for the metallic handle, as shown in Figs. 9 and 12, and if with such handle an end ring or a thumb-rest is desired, I form it of a separate piece of metal, and secure it in the end of the wooden handle, in the manner shown in Fig. 12.

It is obvious that the handle, provided with a ring or thumb support at each end, may be used when desirable by placing the thumb in the front ring, and the little finger in the rear one.

What I claim as new, and desire to secure by Letters Patent, is—

1. A curry-comb side handle, to which is attached a thumb-rest, C, at or near the end adjoining the comb, substantially as and for the purpose specified.

2. A curry-comb side handle, having thumb-rest C, and frame or spider B, formed of one piece, substantially as specified.

In testimony that I claim the above I have hereunto subscribed my name in the presence of two witnesses.

CHARLES A. HOTCHKISS.

Witnesses:
JOHN F. ACKER, Jr.,
ROBERT EVERETT.